(12) United States Patent
Plato et al.

(10) Patent No.: US 6,430,868 B1
(45) Date of Patent: *Aug. 13, 2002

(54) INSECT TRAP FOR CAPTURING NUMEROUS SPECIES OF THE COLEPTERAN ORDER AND METHOD OF OPERATION THEREOF

(76) Inventors: Thomas Alfred Plato, 2001 Holcombe Blvd., #3501, Houston, TX (US) 77030; James Clayton Plato, 11803 Warwickshire Ct., Houston, TX (US) 77077; James Scott Plato, 1235 Redwood Boulh, Houston, TX (US) 77062; Stacy Elizabeth Plato, 2001 Holcombe Blvd., #203, Houston, TX (US) 77030

( * ) Notice: Subject to any disclaimer, the term of this patent is extended or adjusted under 35 U.S.C. 154(b) by 0 days.

This patent is subject to a terminal disclaimer.

(21) Appl. No.: 09/640,830

(22) Filed: Aug. 17, 2000

Related U.S. Application Data

(63) Continuation-in-part of application No. 09/378,002, filed on Aug. 19, 1999, now Pat. No. 6,112,454.

(51) Int. Cl.[7] .............................. A01M 1/10; A01M 1/20
(52) U.S. Cl. ............................................ 43/121; 43/122
(58) Field of Search ........................... 43/107, 121, 122

(56) References Cited

U.S. PATENT DOCUMENTS

| | | |
|---|---|---|
| 161,814 A | 4/1875 | Nelson |
| 249,931 A | 11/1881 | Harned |
| 483,079 A | 9/1892 | McAdams |
| 816,499 A | 3/1906 | Pierce |
| 959,925 A | 5/1910 | Evans |
| 1,059,934 A | 4/1913 | Dodard |
| 1,346,021 A | 7/1920 | Harris |
| 1,626,530 A | 4/1927 | Harris |
| 2,249,601 A | 7/1941 | Chapman .................... 43/121 |
| 3,949,515 A | 4/1976 | Mitchell et al. ............. 43/121 |
| 3,987,577 A | 10/1976 | Hardee ........................ 43/121 |
| 4,551,941 A | 11/1985 | Schneidmiller ............. 43/107 |
| 4,611,425 A | 9/1986 | Dickerson ................... 43/121 |
| 5,243,781 A | 9/1993 | Carter ......................... 43/122 |
| 5,339,563 A | 8/1994 | Job .............................. 43/122 |
| 5,557,880 A | 9/1996 | Schneidmiller ............. 43/122 |

Primary Examiner—Kurt Rowan

(57) ABSTRACT

The present invention comprises a base member, a guiding member positioned upon and supported by the base member and a capture chamber positioned upon and supported by the guiding member. The base member has a tubular body, an open bottom, a top, a plurality of holes in the tubular body and a number of openings in the top. The guiding member is removably connected to the top of the base member. The guiding member comprises a lower ring, an upper ring with a top surface and an outer vertical surface, plastic meshes having a lower section that extends between the lower ring and the upper ring and an upper section that extends conically upwards from the upper ring and has an apex with an orifice, connecting means and a number of apertures and of holes in the top surface of the upper ring. Each connecting means has a hollow upper extension, that is open at its top, and a bottom extension and is used for holding the guiding member in stable position. The capture chamber comprises an open bottom end, a perforated top end, a cylindrical upright body, retention blades for holding pheromone and/or insecticide dispensers and extending downwards from the perforated top end and extending from and interior to the cylindrical upright body, a set of pockets for holding insecticide dispensers and for serving as a refuge for insects, a bottom ring extending outwardly at the open bottom end of and from the cylindrical upright body and having a number of holes for passage of tying means, and locking elements extending downwardly from the cylindrical upright body and a number of holes in the bottom ring.

20 Claims, 7 Drawing Sheets

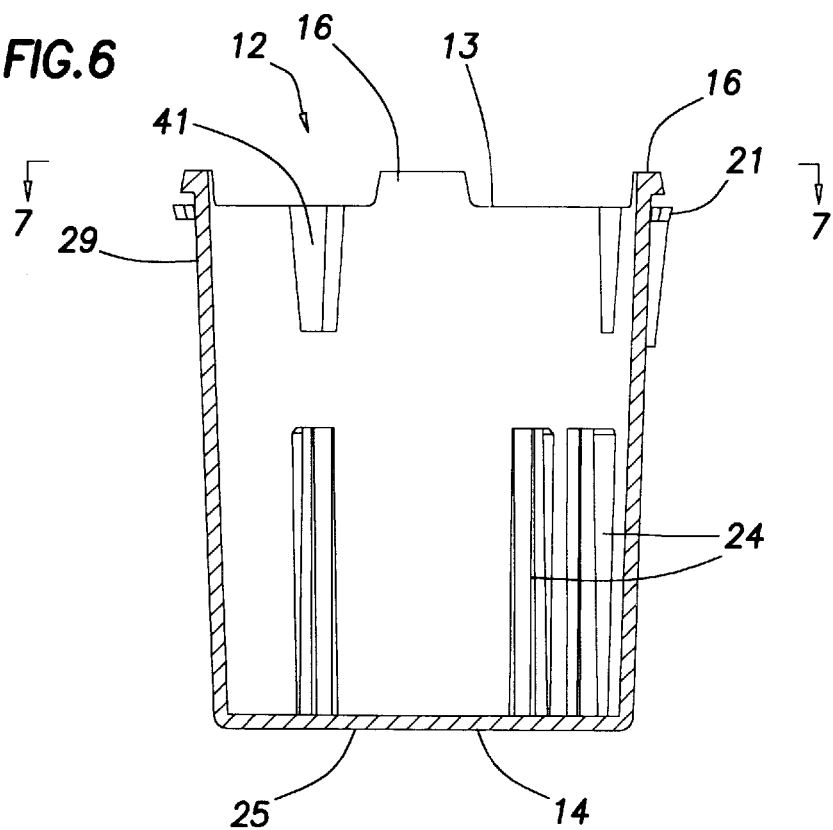
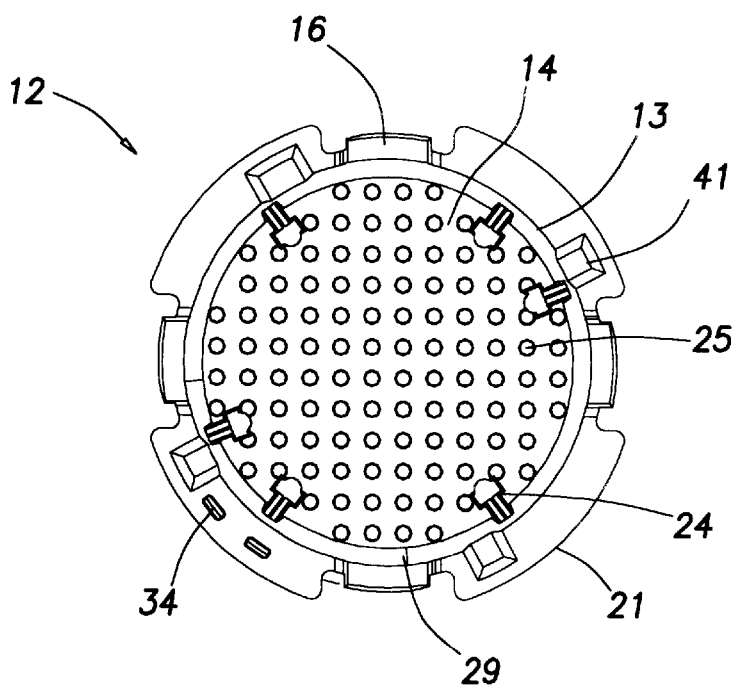

INSECT TRAP FOR CAPTURING NUMEROUS SPECIES OF THE COLEPTERAN ORDER AND METHOD OF OPERATION THEREOF

This application is a continuation-in-part of patent application Ser. No. 09/378,002, filed on Aug. 19, 1999. Now U.S. Pat. No. 6,112,454.

BACKGROUND OF THE INVENTION

1. Field of the Invention

This invention relates to an insect trap for detecting, capturing, monitoring and controlling populations of numerous injurious species of the Coleopteran order of insects.

2. Description of the Prior Art

Numerous species of the Coleopteran order, particularly the boll weevil, have been the most economically damaging insects in the agriculture of the United States. Hundreds of millions of dollars are lost annually due solely to boll weevils. Use of chemical pesticides for controlling boll weevils is very expensive, adding up to tens of millions of dollars per year for protecting cotton plants that are susceptible to boll weevils. Several traps for capturing boll weevils have been presented in the prior art, particularly in Patent Nos. 3,949,515, 3,987,577 and 4,611,425. In general, the traps presented in the patents provide a base member that has a top, an inverted wire mesh funnel that has an orifice and that is connected to the base member to create an annular space between the orifice of the funnel and the top of the base member, and a capture chamber on top of the funnel so that the apex of the funnel substantially extends into the capture chamber. Boll weevils crawl upwardly upon the base member, through the annular space between the funnel and the base member, upwardly along the inside of the funnel, and through an opening at the apex of the funnel, out of the funnel and into the capture chamber. A lure that emits a sex and aggregation pheromone is placed inside the capture chamber to attract the boll weevils to the trap and into the capture chamber. Additionally, insecticides may be placed in the capture chamber to kill the boll weevils. Before the invention of these weevil traps, trapping efforts have not been satisfactory for detecting and monitoring weevil populations during the critical production period of a cotton crop.

SUMMARY OF THE INVENTION

A primary object of the invention is to provide an insect trap for detecting, capturing, monitoring and controlling adult stages of economically damaging insect pest populations, for example cotton boll weevils, sweet potato weevils, pepper weevils, rice water weevils, citrus weevils, pecan weevils and the like.

Another object of the invention is to produce an insect trap that is sufficiently lightweight to be capable of being supported by wooden stakes, broom sticks, bamboo or fiber glass rods, but that is simultaneously held sufficiently stably to avoid being blown off by high windy conditions.

Yet another object of this invention is to produce an insect trap that is small enough to not interfere with tractors and farm equipment that work around a field.

Still another object of this invention is to provide an insect trap that is more efficient in pheromone liberation, easier to assemble, easier to mount on stakes and less expensively fabricated than the prior art.

An additional object of this invention is to provide an insect trap that is easy to clean and maintain.

A further object of this invention is to produce an insect trap that may be quickly hand-assembled without using special tools, that has components that when damaged may be readily replaced, that can be readily dissembled and stored and that has parts which may be compactly stored.

Additional objects and advantages of the invention will be set forth in part in a detailed description which follows, and in part will be obvious from the description, or may be learned by practice of the invention.

The present invention is an insect trap that comprises a plastic base member, a plastic guiding member removably connected to and supported by the base member and a capture chamber removably connected to and supported by the guiding member. The base member is injection molded as one piece by using a single mold and comprises a top, an open bottom, a tubular body extending from the top to the open bottom, a number of openings in the top and, optionally, a plurality of holes in the tubular body and a semi-tubular extension, having tapered veins, extending downwards from the top. The guiding member is injection molded as one piece by using a single mold and is removably connected to the top of the base member. The guiding member comprises a lower ring, an upper ring that is smaller in diameter than the lower ring, plastic meshes and connecting means. The plastic meshes have a lower section, that extends from and connects the lower ring to the upper ring, and an upper section, that extends upwardly from the upper ring as a conical body with an apex having an orifice. The connecting means extend downwardly from and are encircled by the lower section of the plastic meshes and are used for removably connecting the guiding member to the top of the base member. The upper ring is tubular and has an outer vertical surface and a top surface, with a number of apertures and a number of holes in the top surface of the upper ring. The capture chamber comprises a cylindrical upright body, an open bottom end, a perforated top end, a bottom ring encircling the bottom end and having a number of holes, locking elements extending downwardly from the cylindrical upright body, retention blades, extending from and interior to the cylindrical upright body and preferably extending downwards from the perforated top end and used for holding as many as two pheromone dispensers, and a set of pockets, extending from the cylindrical upright body, preferably used for holding the insecticide dispenser and/or as a site for aggregation of insects. The locking elements of the capture chamber are inserted into corresponding apertures in the upper ring of the guiding member. In addition, a tying means may be inserted via one hole of the bottom ring, then through the corresponding aperture in the upper ring of the guiding member and then returned upwards through the adjacent hole in the upper ring and then through the corresponding hole of the bottom ring to be tied back to itself.

It is to be understood that the descriptions of this invention are exemplary and explanatory, but are not restrictive, of the invention. Other objects and advantages of this invention will become apparent from the following specification and from any accompanying charts, examples and drawings.

BRIEF DESCRIPTION OF THE DRAWINGS

The detailed description of the invention is made in reference to the accompanying drawings wherein:

FIG. 6 is an inverted perspective cross-sectional view of the capture chamber of FIG. 1 and is sectioned off the X-axis at an angle of 39°.

FIG. 7 is a bottom view of the capture chamber of FIG. 1.

DETAILED DESCRIPTION OF THE PREFERRED EMBODIMENTS

Figure 1:
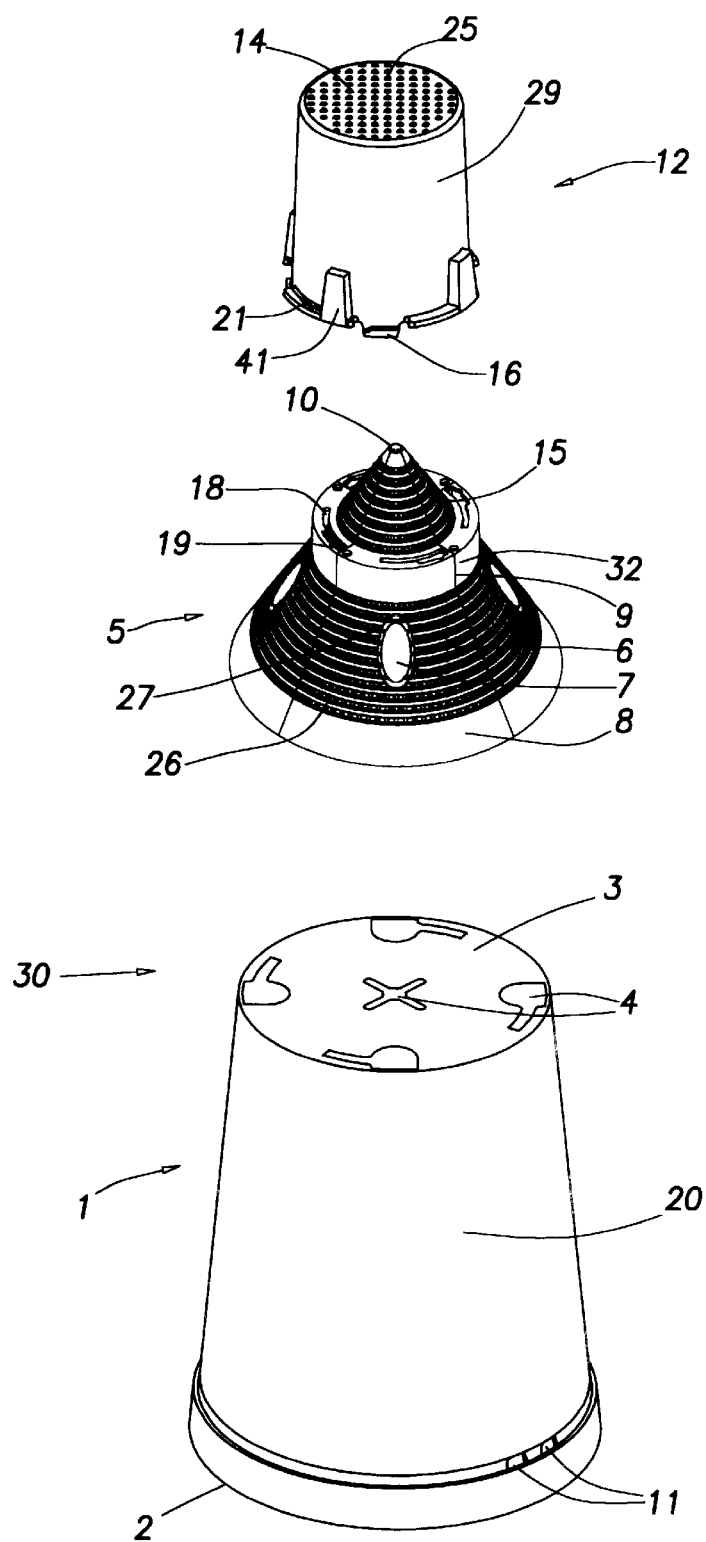
FIG. 1 is an exploded isometric view of an insect trap, comprising a base member, a guiding member and a capture chamber, for capturing numerous species of the Coleopteran order.
Figure 2:
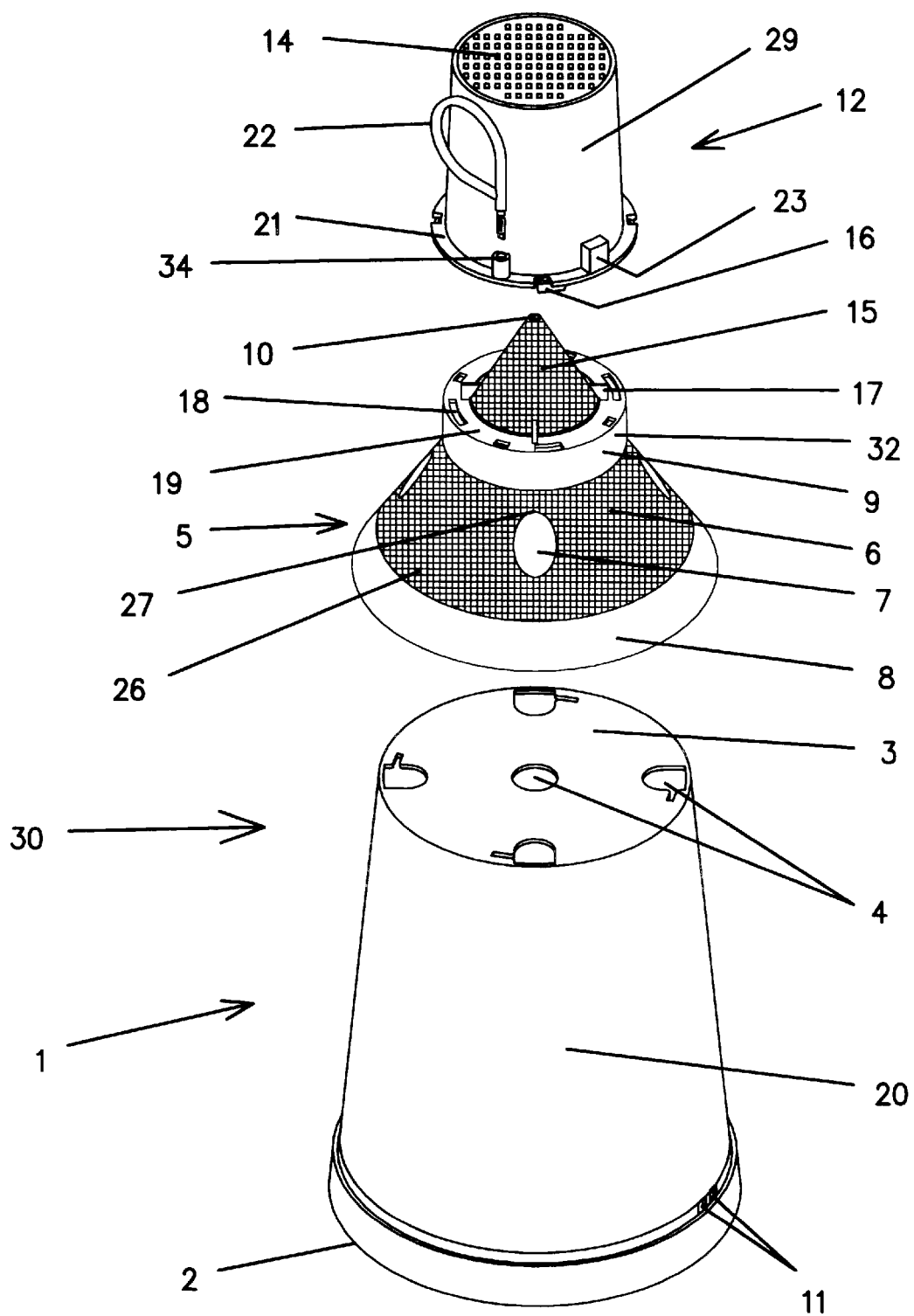
FIG. 2 is an exploded isometric view of an original version of the insect trap of FIG. 1.

Preferred embodiments of the present invention are illustrated in any drawings, charts and examples that are included.

The present invention is an insect trap 30 that comprises a plastic base member 1, a plastic guiding member 5 removably connected to and supported by the base member 1 and a capture chamber 12 removably connected to and supported by the guiding member 5. (Please refer to FIG. 4.) Preferably, the base member 1, the guiding member 5 and the capture chamber 12 are co-axially aligned along their central axis.

The base member 1 is injection molded as one piece by using a single mold and comprises a top 3, an open bottom 2, a tubular body 20 extending from the open bottom 2 to the top 3, a number of openings 4 in the top 3 and a semi-tubular extension 31 having tapered veins 40 and extending downwards from the top 3. (Please refer to FIG. 1, FIG. 3, FIG. 4 and FIG. 8). A plurality of holes 11 are optionally positioned near the open bottom 2 in the tubular body 20 of the base member 1. The tubular body 20 and the top 3 of the base member 1 have an inner surface and an outer surface. The inner surface and the outer surface may be used for bar coding. The semi-tubular extension 31 is surrounded by the tubular body 20 and is preferably curved. The tapered veins 40 extend downwardly from the top 3 and are enclosed by the semi-tubular extension 31.

The number of openings 4 of the top 3 of the base member 1 may serve different purposes. One opening 4, that is central, may serve as an attachment location for a nail or other connecting device on a mounting pole (not shown) which may be used to hold the insect trap 30 in a stable position and to reasonably prevent the displacement of the insect trap 30 due to weather conditions (e.g. wind or rain) or due to other forces (e.g. being hit by an object or a living thing). In a preferred embodiment, the central opening 4 comprises a hole with four arms, in the shape of a cross, that extend outwardly from the hole. Preferably, each arm has a slot width of 0.100 inch and a length of 0.875 inch and the hole has a diameter of 0.250 inch. The insect trap 30 is sufficiently lightweight to be capable of being supported by wooden stakes, broom sticks, bamboo or fiber glass rods. Wooden stakes and broom sticks may be used in the central opening 4 as mounting poles for supporting the insect trap 30. Bamboo and fiber glass rods may also be used as mounting poles to hold the insect trap 30. Bamboo and fiber glass rods are inserted from below into the semi-tubular extension 31. The tapered veins 40 provide narrower pathways for bamboo and fiber glass rods and, thus, enable a tighter fitting of the bamboo and fiber glass rods within the semi-tubular extension 31. In order to increase the stability of the insect trap 30, a tying means, such as a wire, string or plastic tying means, is inserted through the plurality of holes 11 of the tubular body 20 and is used to tie or strap the base member 1 to the bamboo or fiber glass rods. The plurality of holes 11 are aligned with the bamboo or fiber glass rods. If no mounting pole is used, the open bottom 2 of the base member 1 may be simply affixed to an immobile structure or post.

Some of the number of openings 4 in the top 3 of the base member 1 serve as a passageway, leading from the base member 1 to the guiding member 5, for the insects that crawl upwardly on any mounting pole passing through the base member 1 or upwardly upon the inner surface of the tubular body 20. The open bottom 2 is used for the base member 1 in order to allow the insects to move upwardly on the inner surface of the tubular body 20 of the base member 1. Upon reaching the top 3 of the base member 1, the insects pass through the number of openings 4 of the top 3 of the base member 1 into the guiding member 5. Any insects that move on the outer surface of the tubular body 20, upon reaching the top 3 of the base member 1, move via a gap that exists between the guiding member 5 and the tubular body 20 of the base member 1 into the guiding member 5.

Figure 5A:
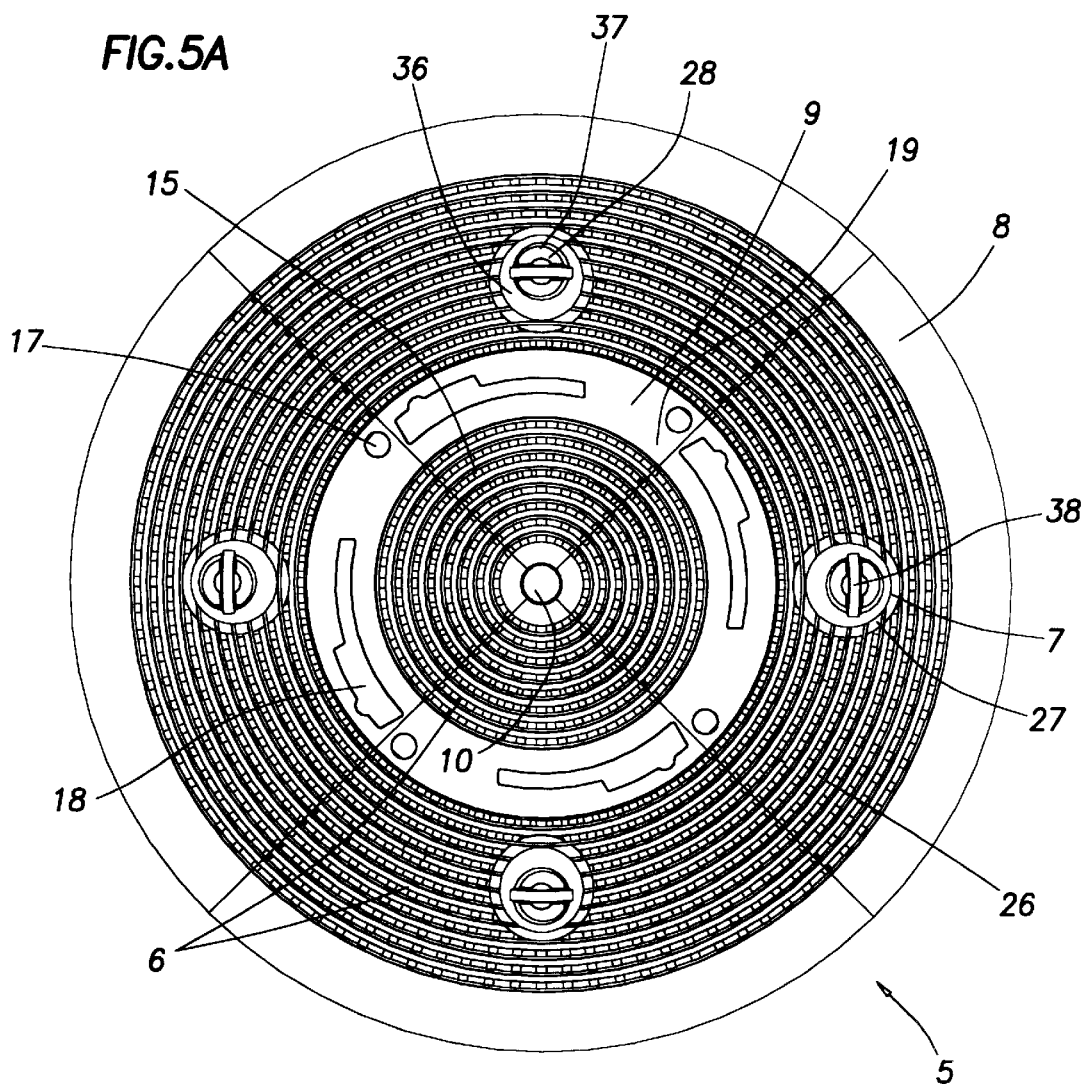
FIG. 5A is a top view of the guiding member of FIG. 1.

The guiding member 5 is injection molded as one piece by using a single mold and is removably connected to the top 3 of the base member 1. As shown in FIG. 1 and FIG. 5A, the guiding member 5 comprises a lower ring 8 that has a larger diameter than the top 3 of the base member 1, an upper ring 9 that has a smaller diameter than the lower ring 8, plastic meshes 6 and connecting means 7. (As defined in The American Heritage Dictionary, Second College Edition, 1985, the term "mesh" refers to "any of the open spaces in a cord, thread or wire network" and the term "meshes" refers to "the cords, threads or wire surrounding these spaces". To avoid any confusion, the term "open spaces" is used herein to refer to the open spaces in the network, while the term "meshes" is used herein to refer to the cords or threads themselves.) Plastic meshes 6, versus a solid or wire funnel, are used since the plastic meshes 6 eliminate heat build-up, as with the solid, and manufacturing problems, as with the wire, while providing for a more efficient pheromone dispersal.

The lower ring 8 has a slanted ringular body that has the same slope as that of the plastic meshes 6. The upper ring 9 has an outer vertical surface 32 that is cylindrical and that extends at a perpendicular angle to horizontal cross-sections of the plastic meshes 6. The upper ring 9 has a top surface 19 that is horizontal and ringular and extends inwardly, towards the central vertical axis of the guiding member 5, from an outer circle (i.e., top of the outer vertical surface 32 of the upper ring 9) to an inner circle. A number of apertures 18 and a number of holes 17 exist in the top surface 19 of the upper ring 9. The number of apertures 18 preferably comprise a wider section and a narrower section that is an extension of the wider section, with both the wider section and the narrower section being slightly curved and sloped and extending along the outer circle (as well as the inner circle) of the top surface 19 of the upper ring 9. Dividing the number of apertures 18 into the wider section and the narrower section results in a more stable positioning of the capture chamber 12 after the capture chamber 12 is attached to the guiding member 5. Also, with the direction of turn in tightening being towards the narrower section, the narrower section allows a more gradual tightening of the capture chamber 12 by providing additional degrees of rotation through the number of apertures 18. The number of holes 17 of the upper ring are preferably circular and are used as a passage for tying means that connects the capture chamber 12 to the guiding member 5. The upper ring 9 preferably surrounds a hollow space when the insect trap 30 is not assembled. In order to maximize the stability of and minimize movements of the plastic meshes 6 and to hold the plastic meshes 6 in a conical shape, the plastic meshes 6 extend from and connect the lower ring 8 to the upper ring 9 and extend upwardly from and above the upper ring 9. (Please refer to FIG. 3 and FIG. 5A.) The plastic meshes 6 comprise a lower section 26, which includes several discontinuations in the meshes, and an upper section 15 which is conical. The lower section 26 of the plastic meshes 6 extends at a slope from top of the lower ring 8 to bottom of the upper ring 9 of the guiding member 5. The lower section 26 of the plastic meshes 6 ends at bottom of the outer vertical surface 32 of the upper ring 9. Thus, the lower section 26 of the plastic meshes 6 and the ringular body of the lower ring 8 share common surface planes. The upper section 15 of the plastic meshes 6 extends conically upwards from and above the inner circle of the top surface 19 of the upper ring 9 to form a conical body with an apex 10 having an orifice. In a preferred embodiment, the orifice has a diameter of approximately 0.0125 inch to 0.300 inch, enabling use of the insect trap 30 for various versions of the Coleopteran order. The upper section 15 of the plastic meshes 6 is arranged at a position to enable the continuation of the slope of the lower section 26 of the plastic meshes 6, such that the lower section 26, the upper section 15 and the lower ring 8 have the same slope. (Refer to FIG. 1.) Thus, even though the plastic meshes 6 are divided into the lower section 26 and the upper section 15, the plastic meshes 6 are ensemble in a conical shape. The plastic meshes 6 are designed in a conical shape in order to facilitate the movement of the trapped insects into the capture chamber 12, which has a smaller radius than the lower ring 8 of the guiding member 5.

Upon entering the guiding member 5, the insects approach the plastic meshes 6 of the guiding member 5 and crawl upwardly within the guiding member 5 along the plastic meshes 6. Therefore, the open spaces existing among the plastic meshes 6 must be particularly sized to prevent the insects from escaping from the insect trap 30 by exiting via the open spaces of the plastic meshes 6. (The orifice of the apex 10 is not considered as an "open space" existing among the plastic meshes 6. The orifice is a hole at the apex 10 of the plastic meshes 6 and, for the entrapped species, serves as an entrance into the capture chamber 12.) The relatively small orifice of the apex 10 of the plastic meshes 6 has to be at least large enough to allow the exit of the insects from inside the plastic meshes 6 into the capture chamber 12. Meanwhile, the relatively small orifice of the apex 10 has to be small enough to not effect the shape of the plastic meshes 6 and has to be at the very top of the plastic meshes 6 in order to allow the upwardly-crawling insects to move as far into the capture chamber 12 as possible.

Figure 3:
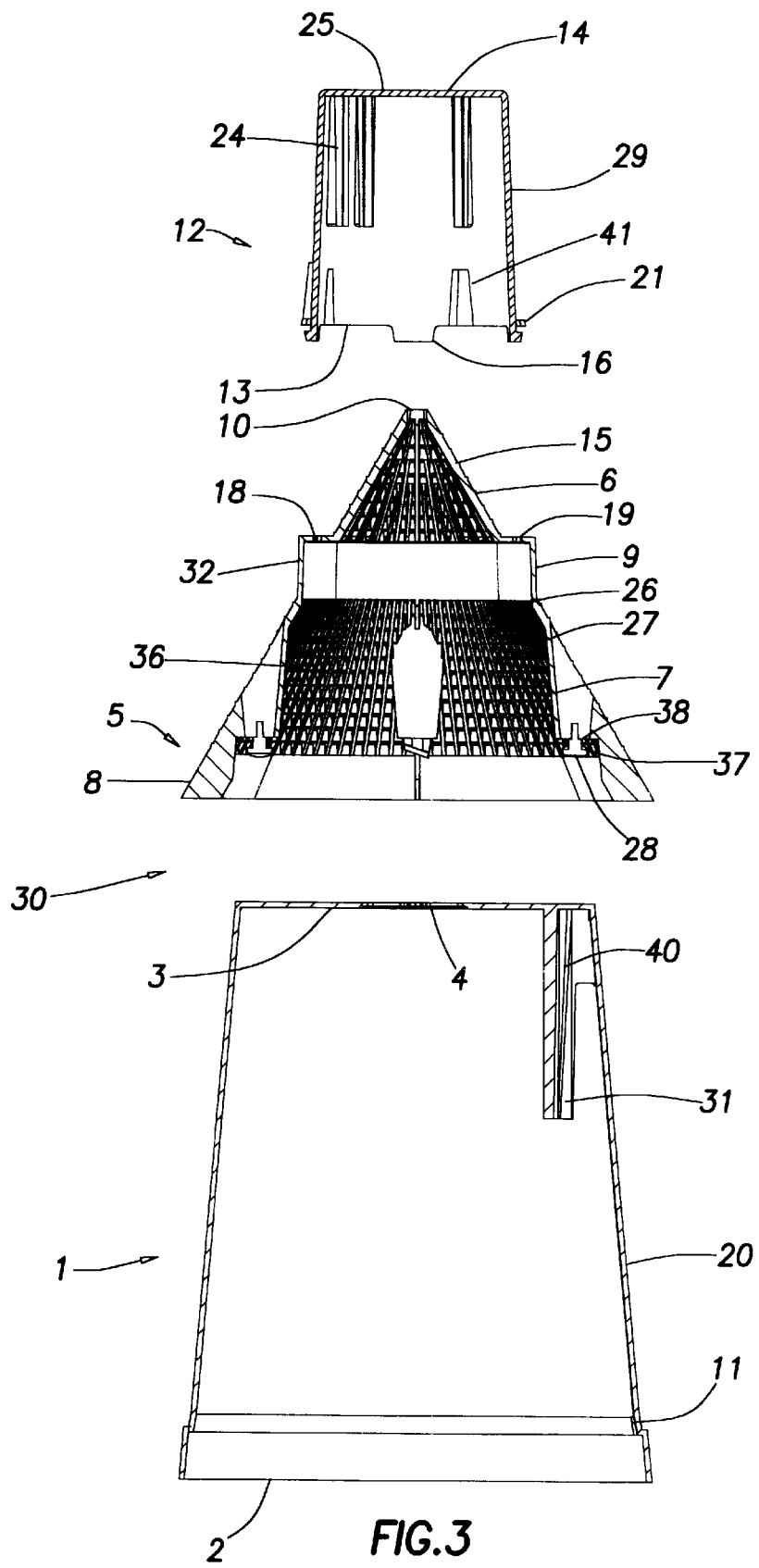
FIG. 3 is a cross-sectional view of the insect trap of FIG. 1.
Figure 5B:
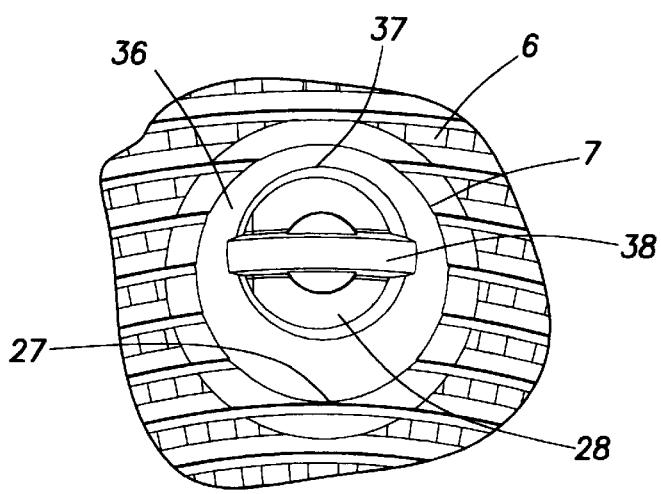
FIG. 5B is an enlarged view of a connecting means used in FIG. 5A.
Figure 8:
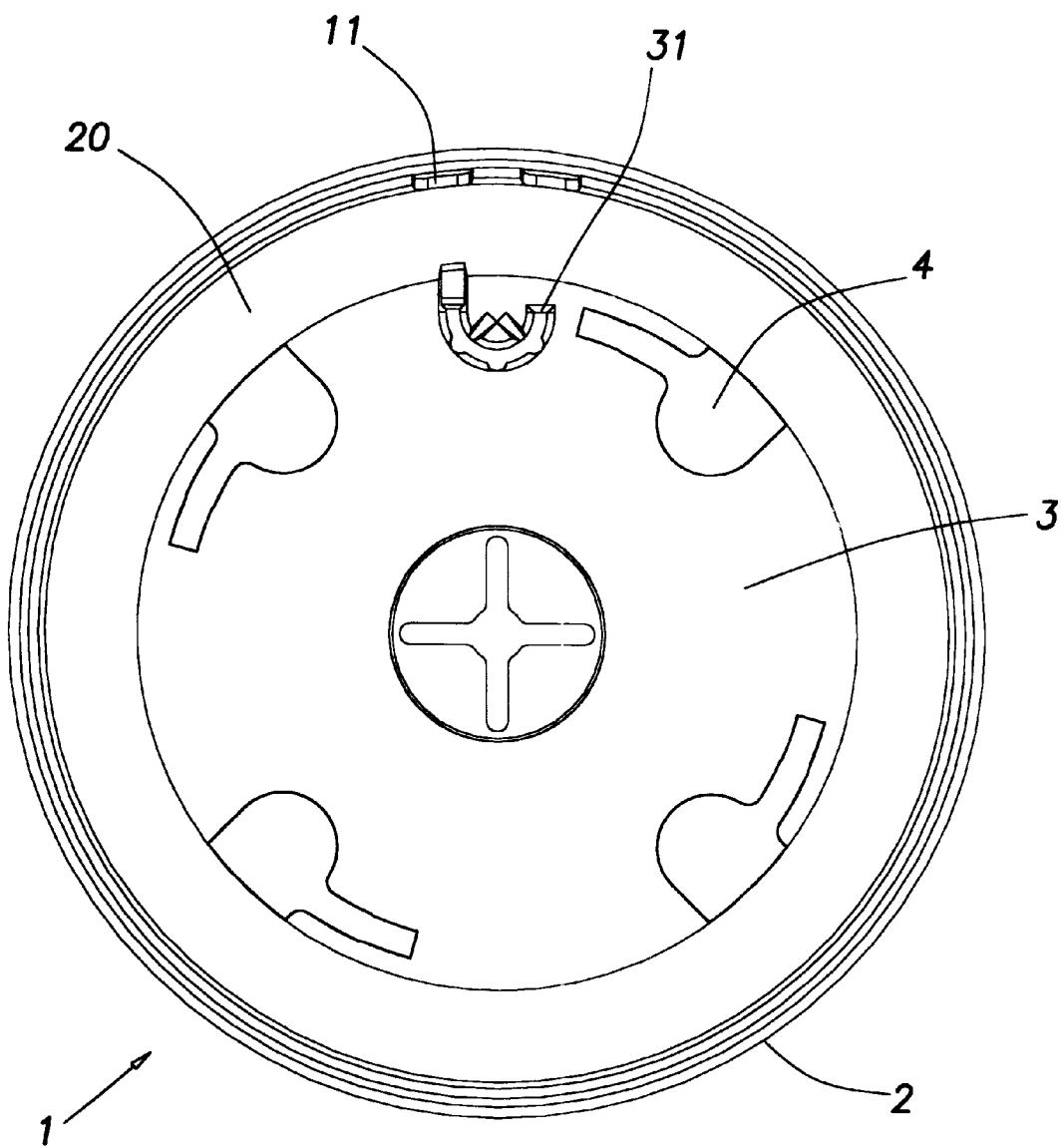
FIG. 8 is a bottom view of the base member of FIG. 1.

As shown in FIG. 3, FIG. 5A and FIG. 5B, each connecting means 7 comprises a hollow upper extension 36 and a bottom extension 28. Each hollow upper extension 36 has an open top 27. All the connecting means 7 extend downwardly from the lower section 26 of the plastic meshes 6, with the open top 27 of each connecting means 7 forming a discontinuation and an empty open area in the plastic meshes 6 of the lower section 26. (Please refer to FIG. 1 and FIG. 3.) The hollow upper extension 36 of the connecting means 7 is designed as a supporting column. The shorter is the hollow upper extension 36 of the connecting means 7, the smaller is the gap existing between the guiding member 5 and the base member 1. The open top 27 of each connecting means 7 is adjusted to conform to the slope of the plastic meshes 6 and to help to maintain the conical shape of and to oppose disfigurement of the plastic meshes 6. In a preferred embodiment, shown in FIG. 3, the open top 27 of the connecting means 7 is considerably wider than the bottom extension 28 of the connecting means 7. However, the insects cannot exit the guiding member 5 via the open top 27 of the connecting means 7 since the hollow upper extension 36 is essentially covered at its bottom by the bottom extension 28. Therefore, the insects that are crawling upwards upon the interior of and along the plastic meshes 6 never enter the hollow upper extension 36 that opens towards outside of the guiding member 5. Also, since the boll weevils normally only travel upwards, they are not likely to move downwards along outer surface of the hollow upper extension 36. Thus, the connecting means 7 serve as supports for the guiding member 5, without allowing escape of the insects from the insect trap 30.

The bottom extension 28 of the connecting means 7 comprises a bottom portion 37 and a cross-sectional, upwardly-extending blade 38 (as shown in FIG. 3 and FIG. 5A). The bottom portion 37 is preferably circular or semi-circular. The bottom portion 37 has a top surface that is basically perpendicular to the cross-sectional, upwardly-extending blade 38, which extends upwardly from the bottom portion 37 to and above the bottom of the hollow upper extension 36. The cross-sectional, upwardly-extending blade 38 merges with the hollow upper extension 36. The bottom portion 37 preferably has a larger horizontal surface area than the cross-sectional, upwardly-extending blade 38 has and the cross-sectional, upwardly-extending blade 38 extends upwards from below the hollow upper extension 36. Thus, a gap exists between the bottom portion 37 and the bottom of the hollow upper extension 36.

Figure 4:
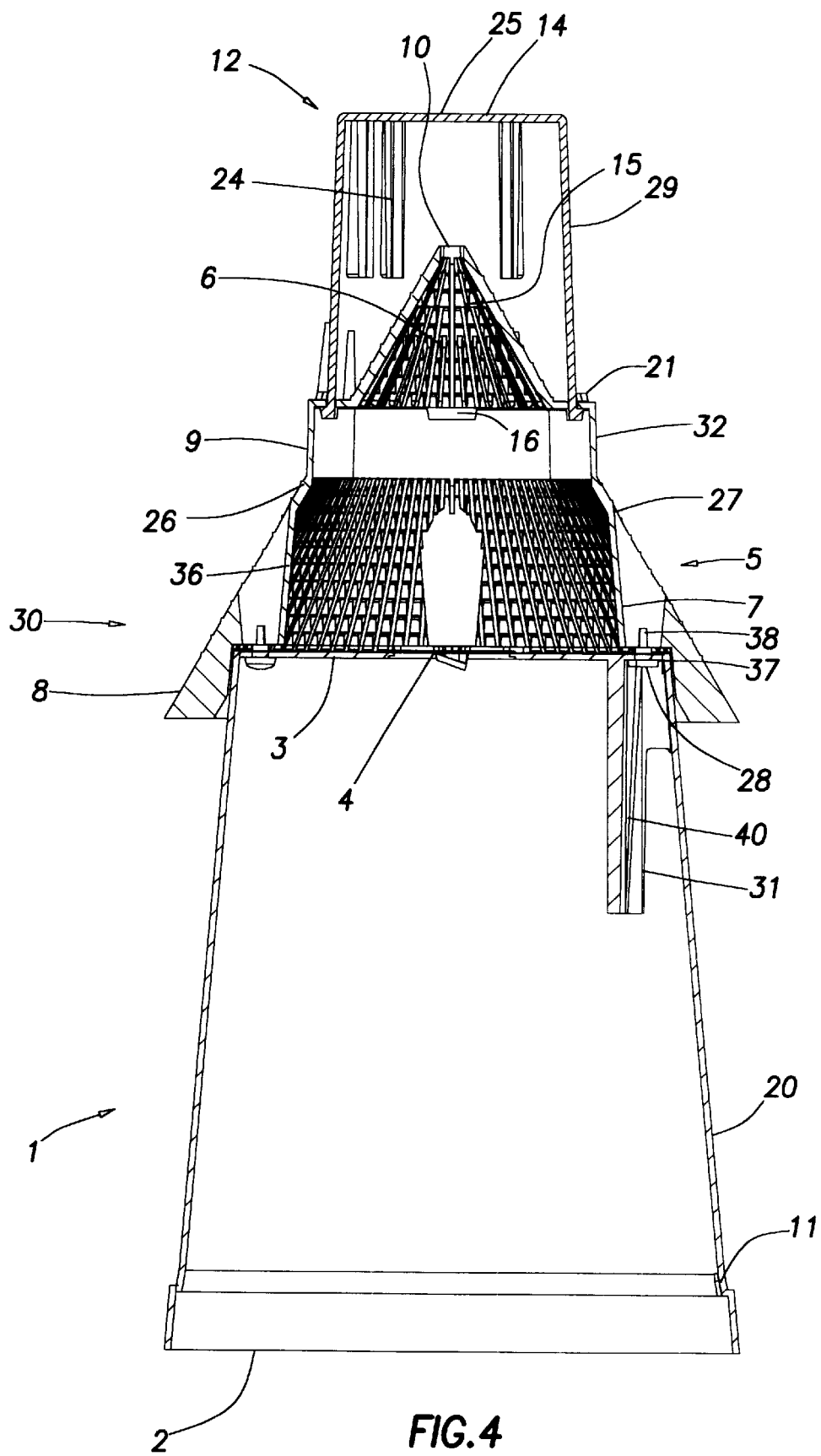
FIG. 4 is an assembled cross-sectional view of FIG. 1.

The bottom extension 28 of the connecting means 7 is an essential component for removably connecting the guiding member 5 to the top 3 of the base member 1. Each bottom extension 28 of the connecting means 7 is removably inserted into the corresponding opening 4 of the top 3 of the base member 1 to interlock the base member 1 and the guiding member 5. The bottom extension 28 is sized to easily fit into the corresponding opening 4 of the top 3 of the base member 1 (as shown in FIG. 4). The number of openings 4 of the top 3 each have a wider section (refer to FIG. 1 and FIG. 7), that is wide enough to allow insertion of only the bottom extension 28 of the connecting means 7, and a narrower section that is wide enough to allow entrance of only the cross-sectional, upwardly extending blade 38 of the bottom extension 28. The guiding member 5 is connected to the base member 1 upon placing the bottom extension 28 of each connecting means 7 into the wider section of the corresponding opening 4 of the base member 1 and then twisting the guiding member 5 in one direction such that the cross-sectional, upwardly extending blade 38 of the bottom extension 28 is moved into and is set in the narrower section of the corresponding opening 4. In a preferred embodiment, the narrower section of the corresponding opening 4 is slightly curved and sloped and extends along outer edge of the top 3 of the base member 1. Curving and sloping the narrower section of the number of openings 4 results in easing a resistance that has been encountered in attaching the guiding member 5 to the base member 1. An increase in length of the narrower section allows a more gradual tightening by providing additional degrees (preferably an additional ten degrees) of rotation through openings 4 that are narrowed down in the direction of turn. As long as the cross-sectional, upwardly-extending blade 38 is positioned in the narrower section of the corresponding opening 4, the bottom extension 28 cannot be pulled out of the opening 4 since the bottom portion 37 of the bottom extension 28 has a larger horizontal surface area than the narrower section of the opening 4 does. This serves as an additional locking mechanism that can only be unlocked upon twisting the guiding member 5 in an opposite direction (e.g. clockwise versus counter-clockwise, or vice versa), such that the bottom extension 28 of the connecting means 7 moves into the wider section of the corresponding opening 4 of the top 3 of the base member 1 and can then be pulled out of the opening 4. Such a double-locking mechanism has not been used in the prior art and only requires two simple steps: positioning the bottom extension 28 of the connecting means 7 into the corresponding opening 4 of the top 3 of the base member 1 and slightly twisting the guiding member 5.

In a preferred embodiment, when the insect trap 30 is assembled, the cross-sectional, upwardly-extending blade 38 of each connecting means 7 extends perpendicular to and the bottom portion 37 extends basically parallel to the top 3 of the base member 1. No matter what type of connecting means 7 is used, when the connecting means 7 are connected to the base member 1, a gap must remain between the tubular body 20 of the base member 1 and the lower ring 8 of the guiding member 5. The gap is required in order to allow the passage of the insects that are crawling on the outside surface of the tubular body 20 of the base member 1 into the guiding member 5. This gap must be large enough to allow the entrance of the insects into the guiding member 5. However, the gap should not be too large to prohibit the insects that are near or on the top 3 of the base member 1 to reach, by crawling, the inner surface of the sloped lower ring 8 and of the lower section 26 of the plastic meshes 6. The dimensional stability of this gap is maintained in the insect trap 30 if the insect trap 30 has been correctly assembled, particularly since separation of the guiding member 5 from the base member 1 is avoided upon application of the connecting means 7. Also, the lower ring 8 and the plastic meshes 6, which are extensions of the lower ring 8, are in a stable position as long as the connecting means 7 are applied.

The capture chamber 12 comprises a cylindrical upright body 29, an open bottom end 13, a perforated top end 14, a bottom ring 21 being an extension of the cylindrical upright body 29 at and encircling the open bottom end 13, locking elements 16 extending downwardly from the cylindrical upright body 29, retention blades 24 and a set of pockets 41 extending from the cylindrical upright body 29. (Please refer to FIG. 1, FIG. 6 and FIG. 7.) The retention blades 24 are used for holding the pheromone and/or insecticide dispensers. With the retention blades 24 extending downwardly from the perforated top end 14 and from and inwardly to the cylindrical upright body 29 of the capture chamber 12, the insect trap 30 is more efficient than the prior art in pheromone liberation. In a preferred embodiment, six retention blades 24 extend from and inwardly to the cylindrical upright body 29. The set of pockets 41 may be used for holding insecticide dispensers and may also serve as resting or refuge areas for the trapped insects. The set of pockets 41 is preferably tapered to more stably engage and retain the insecticide dispenser. The set of pockets 41 extend from and inwardly to the cylindrical upright body 29. In a preferred embodiment, there are three interior pockets 41. In addition, a number of holes 34 exist in the bottom ring 21. There are preferably two holes 34 of 0.110 inch by 0.050 inch in the bottom ring 21. Thus, a tying means (such as a nylon or plastic tying means) may be inserted and passed through one hole 34 and, then, through the corresponding aperture 18 of the guiding member 5. The tying means can then be turned upwards through the adjacent hole 17 of the guiding member 5, through the corresponding hole 34 of the bottom ring 21 and then be tied up in order to avoid any tampering of connection of the capture chamber 12 to the guiding member 5.

Indented openings exist in the bottom ring 21 where the locking elements 16 are located. The locking elements 16 of the capture chamber 12 are inserted into any corresponding apertures 18 of the upper ring 9 of the guiding member 5. The locking elements 16 are preferably beveled to provide an easier and better fit of the locking elements 16 in the corresponding apertures 18 of the upper ring 9. The locking elements 16 are beveled such as to enable an easy, smooth and quick entry of the locking elements 16 into (and their exit out of) the wider section of each corresponding aperture 18 of the upper ring 9 of the guiding member 5 during attachment of the capture chamber 12 to the guiding member 5 (and their separation, respectively). In addition, the locking elements 16 are shaped such as to prevent separation of the capture chamber 12 from the guiding member 5 whenever, upon twisting the capture chamber 12 in one direction, the locking elements 16 are positioned in the narrower section of each aperture 18, unless the capture chamber 12 is then twisted in the opposite direction to move back the locking elements 16 into and out of the wider section of each aperture 18. An empty space exists in the upper ring 9 below the top surface 19. Upon twisting the capture chamber 12, after the locking elements 16 of the bottom ring 21 are positioned into the corresponding aperture 18 of the upper ring 9, the locking elements 16 move in the empty space under the top surface 19 of the upper ring 9 and cannot be removed until the capture chamber 12 is twisted back and the locking elements 16 are aligned again with the wider section of the number of apertures 18.

Also, in order to minimize manufacturing expenses and simplify use of the capture chamber 12, the perforated top end 14 of the capture chamber 12 is preferably irremovable and is an extension of the cylindrical upright body 29 of the capture chamber 12. The perforated top end 14 of the capture chamber 12 may consist of a basically flat surface that is perforated with a number of perforations 25. In a preferred embodiment, the number of perforations 25 in the perforated top end 14 are circular and have a diameter of about 0.075 inches. Since the pheromone dispenser is preferably positioned in the capture chamber 12, the number of perforations 25 in the perforated top end 14 of the capture chamber 12 play an essential role in enhancing the pheromone dispersal. A suitable carrier of the pheromone is a plastic laminate or PVC matrix (referred to as media) containing grandlure or any other pheromone, said media allowing the slow release of grandlure for a relatively long period of time (e.g. two to three weeks ). The media are placed in the retention blades 24 that extend downwards from the perforated top end 14 of the capture chamber 12. An insecticide dispenser is placed in the set of pockets 41 of the capture chamber 12 to kill the insects and to eliminate the insects from escaping through the orifice of the apex 10 of the guiding member 5.

The bottom ring 21 of the capture chamber 12 preferably fits upon, is removably connected to and is supported by the upper ring 9 of the guiding member 5. Therefore, the bottom ring 21 of the capture chamber 12 preferably has an outer diameter that is equivalent to the outer diameter of the upper ring 9 of the guiding member 5. Meanwhile, the diameter of the cylindrical upright body 29 of the capture chamber 12 is large enough to enable a simple and quick positioning of the open bottom end 13 of the cylindrical upright body 29 around the upper section 15 of the plastic meshes 6 of the guiding member 5. In addition, the capture chamber 12 is placed upon the upper ring 9 of the guiding member 5 in such a position to align the locking elements 16 of the capture chamber 12 with their corresponding apertures 18 of the upper ring 9 of the guiding member 5 and to align the number of holes 34 of the bottom ring 21 of the capture chamber 12 with their corresponding holes 17 of the upper ring 9 of the guiding member 5. Thus, when the capture chamber 12 is correctly positioned upon the upper ring 9 of the guiding member 5, the locking elements 16 of the capture chamber 12 easily and quickly fit into the corresponding apertures 18 of the upper ring 9. Meanwhile, a nylon or plastic tying means can be easily inserted through the corresponding hole 34 of the bottom ring 21, into the corresponding aperture 18 of the upper ring 9 of the guiding member 5 and, then, turned upwards into the adjacent hole 17 of the upper ring 9 and then through the corresponding hole 34 of the bottom ring 21 of the capture chamber 12. The tying means is then tied up in order to avoid any tampering of connection of the capture chamber to the guiding member. As a result, the introduction of or release of any species out of the capture chamber 12 can be detected, with no gap existing between the bottom ring 21 of the capture chamber 12 and the upper ring 9 of the guiding member 5 when the capture chamber 12 is correctly positioned upon the upper ring 9. The capture chamber 12 is preferably designed such that upon twisting the capture chamber 12 after the locking elements 16 are placed in the corresponding apertures 18 of the upper ring 9, the number of holes 17 into which the nylon or plastic tying means is to be inserted are aligned with the corresponding holes 34 of the bottom ring 21 of the capture chamber 12.

In addition, the capture chamber 12 must be long enough to ensure that, not only does the apex 10 of the plastic meshes 6 of the guiding member 5 rest in the capture chamber 12 but also, some free space remains between the apex 10 of the upper section 15 of the plastic meshes 6 and the perforated top end 14 of the capture chamber 12. When the insect trap 30 is assembled, some free space is needed between the upper section 15 of the plastic meshes 6 and the capture chamber 12 for collection of any insects that exit the plastic meshes 6 via the orifice at the apex 10. Meanwhile, the insect trap 30 is small enough to not interfere with tractors and farm equipment that work around a field.

With the base member 1, the guiding member 5 and the capture chamber 12 being readily removable, they may be easily cleaned, maintained and replaced, making the insect trap 30 effective, very economical and long-lasting. In addition, due to its removability, the insect trap 30 may be readily assembled, dissembled, loaded, stacked and compactly stored. The insect trap 30 may be quickly hand assembled without special tools. As a result, the insect trap 30 provides substantial savings in labor and storage requirements.

The insect trap 30 preferably includes polypropylene, making the insect trap 30 flexible and recyclable. Ultraviolet-resistant components may be used in the insect trap 30. Thus, any physical degradation of the insect trap 30 is minimized.

The base member 1 of the insect trap 30 is preferably fluorescent yellow-green in color. Such color has been proven, through years of careful research, to be attractive to various Coleopteran species. Of course, although it is optional, it is not necessary to make every component of the insect trap 30 fluorescent yellow-green. The capture chamber 12 is made of clear acrylic or styrene to allow the user to determine, without having to remove the capture chamber 12, the effectiveness of the insect trap 30 by periodically visually inspecting the contents inside the capture chamber 12. It should be emphasized that the components of the insect trap 30 may be of various other colors as well, depending upon the particular species of insects for which the insect trap 30 is designed. Such colors include, but are not limited to, green, red, yellow, clear and opaque.

As is clearly shown above, the method of operation of the insect trap is extremely simple. Upon properly positioning the guiding member 5 upon the base member 1 such that the bottom extensions 28 of the connecting means 7 each go into the corresponding opening 4 of the top 3 of the base member 1, simply twisting or rotating the guiding member 5 in one direction causes an interlocking of the guiding member 5 with the base member 1. Then, twisting or rotating the guiding member 5 in the opposite direction moves the guiding member 5 to a position whereat the guiding member 5 can be separated from the base member 1 simply by lifting the guiding member 5. Similarly, upon properly positioning the capture chamber 12 upon the guiding member 5 such that the locking elements 16 of the capture chamber 12 each go into the corresponding aperture 18 of the upper ring 9 of the guiding member 5, simply twisting or rotating the capture chamber 12 in one direction causes an interlocking of the capture chamber 12 with the guiding member 5. Then, twisting or rotating the capture chamber 12 in the opposite direction moves the capture chamber 12 to a position whereat the capture chamber 12 can be separated from the guiding member 5 simply by lifting the capture chamber 12.

Certain objects are set forth above and made apparent from the foregoing description and examples, as well as drawings. However, since certain changes may be made in the drawings, description and examples without departing from the scope of the invention, it is intended that all matters contained in the drawings, description and examples shall be interpreted as illustrative only of the principles of the invention and not in a limiting sense. With respect to the drawings, description and examples, it is to be realized that any descriptions, drawings and examples deemed readily apparent and obvious to one skilled in the art and all equivalent relationships to those stated in the examples, described in the specification and shown in the drawings are intended to be encompassed by the present invention.

Further, since numerous modifications and changes will readily occur to those skilled in the art, it is not desired to limit the invention to the exact construction and operation shown and described and, accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

| Insect trap | 30 |
|---|---|
| Base member | 1 |
| semi-tubular extension | 31 |
| tapered veins | 40 |
| top | 3 |
| number of openings | 4 |
| open bottom | 2 |

-continued

| | |
|---|---|
| tubular body | 20 |
| plurality of holes | 11 |
| Guiding member | 5 |
| plastic meshes | 6 |
| upper section | 15 |
| lower section | 26 |
| apex | 10 |
| lower ring | 8 |
| upper ring | 9 |
| outer vertical surface | 32 |
| number of holes | 17 |
| number of apertures | 18 |
| top surface | 19 |
| connecting means | 7 |
| hollow upper extension | 36 |
| open top | 27 |
| bottom extension | 28 |
| bottom portion | 37 |
| cross-sectional, upwardly-extending blade | 38 |
| Capture chamber | 12 |
| open bottom end | 13 |
| perforated end | 14 |
| retention blades | 24 (pheromone and/or insecticide) |
| number of perforations | 25 |
| bottom ring | 21 |
| number of holes | 34 |
| cylindrical upright body | 29 |
| set of pockets | 41 |
| locking elements | 16 |

What is claimed is:

1. An insect trap, for capturing numerous species of the Coleopteran order, that comprises:
   (a) a plastic base member injection-molded as one piece and comprising:
      (i) a top including a number of openings,
      (ii) an open bottom, and
      (iii) a tubular body extending from the open bottom to the top;
   (b) a plastic guiding member injection-molded as one piece and comprising:
      (i) a lower ring that is larger in diameter than the top of the base member,
      (ii) an upper ring that is smaller in diameter than the lower ring and that comprises a cylindrical outer vertical surface, a horizontal, ringular top surface, extending inwards from top of the outer vertical surface, and a number of apertures and a number of holes in the ringular top surface,
      (iii) plastic meshes that comprise a lower section, extending from and connecting the lower ring to the upper ring and having the same slope as the lower ring, and an upper section, extending upwardly from and above the upper ring as a conical body that has an apex and an orifice at the apex, and
      (iv) connecting means that extend downwardly from the lower section of the plastic meshes and that each comprises a hollow upper extension, having an open top that forms a discontinuation in the plastic meshes of the lower section and serving as a supporting column, and a bottom extension, comprising a bottom portion and a cross-sectional, upwardly-extending blade that has a smaller horizontal surface area than the bottom portion has and that extends upwardly from the bottom portion to the hollow upper extension, such that a space exists between the bottom portion and the hollow upper extension and such that a gap forms between the lower ring of the guiding member and the tubular body of the base member when the bottom extension is removably inserted into the corresponding opening of the top of the base member; and
   (c) a capture chamber removably connected to the upper ring of and supported by the guiding member and comprising:
      (i) a cylindrical upright body with an open bottom end, a perforated top end that are extensions of the cylindrical upright body, and a bottom ring, that has a number of holes, that is an outward extension of the cylindrical upright body at the open bottom end and that is positioned upon the upper ring of the guiding member when the insect trap is assembled,
      (ii) locking elements that extend downwardly from the cylindrical upright body and are inserted into the corresponding apertures of the upper ring of the guiding member,
      (iii) retention blades that extend downwards from the perforated top end and interior to and from the cylindrical upright body, and
      (iv) a set of pockets that extend from and inwardly to the cylindrical upright body;
   such that, when the guiding member is removably mounted onto the top of the base member and the capture chamber is removably mounted onto the upper ring of the guiding member, the base member, the guiding member and the capture chamber are co-axially aligned along their central axis and the upper section of the plastic meshes rests in the capture chamber.

2. The insect trap of claim 1, wherein at least one opening of the top of the base member serves as an attachment location for a nail or other connecting device on a mounting pole used to hold the insect trap.

3. The insect trap of claim 1, wherein the base member additionally comprises a semi-tubular extension extending downwards from the top of the base member and interior to the tubular body of the base member and having tapered veins.

4. The insect trap of claim 1, wherein a plurality of holes are near the open bottom of and in the tubular body of the base member, with the plurality of holes in the tubular body serving as an entrance for a tying means used to tie or strap the base member to a mounting pole that is inserted from the open bottom and that is surrounded by the tubular body.

5. The insect trap of claim 1, wherein:
   (a) the lower section of the plastic meshes extends to and ends at bottom of the outer vertical surface of the upper ring; and
   (b) the upper section of the plastic meshes extends from and above inner circle of the top surface of the upper ring;
   such that the upper section of the plastic meshes, the lower section of the plastic meshes and the lower ring have the same slope.

6. The insect trap of claim 1, wherein:
   (a) the plastic meshes have open spaces that are particularly sized to prevent insects in the guiding member from exiting via the open spaces of the plastic meshes; and
   (b) the orifice at the apex of the plastic meshes is at least large enough to allow the exit of the insects from inside the plastic meshes into the capture chamber.

7. The insect trap of claim 1, wherein the orifice has a diameter of between about 0.0125 inch to about 0.300 inch.

8. The insect trap of claim 1, wherein the number of openings of the top of the base member each have:

(a) a wider section that is wide enough to allow insertion of only the bottom extension of the connecting means; and (b) a narrower section that is curved and sloped and is wide enough to allow entrance of only the cross-sectional, upwardly-extending blade of the bottom extension;

such that the guiding member is connected to the base member upon placing the bottom extension of each connecting means into the wider section and, then, twisting the guiding member in one direction whereby the cross-sectional, upwardly-extending blade is moved into and is set in the narrower section; and such that the guiding member can be separated by twisting the guiding member in the opposite direction and, then, lifting the guiding member.

9. The insect trap of claim 8 wherein, when the guiding member is connected to the base member, the cross-sectional, upwardly-extending blade of each connecting means extends perpendicular to the top of the base member and the bottom portion extends parallel to the top of the base member.

10. The insect trap of claim 1, wherein the number of apertures of the upper ring of the guiding member each comprise a wider section and a narrower section that is an extension of the wider section, with both the wider section and the narrower section being slightly curved and sloped and extending along the ringular top surface of the upper ring;

such that the capture chamber is connected to the guiding member upon placing the locking elements of the capture chamber into the wider section of the number of apertures of the upper ring of the guiding member and, then, twisting the capture chamber in one direction whereby the locking elements are moved into and set in the narrower section of the number of apertures; and such that the capture chamber can be separated from the guiding member by twisting the capture chamber in the opposite direction and, then, lifting the capture chamber.

11. The insect trap of claim 1, wherein a tying means is passed downwards through one of the number of holes of the bottom ring of the capture chamber, into the corresponding aperture of the upper ring of the guiding member, then, is turned upwards through the adjacent hole of the upper ring of the guiding member and then through the corresponding hole of the bottom ring of the cylindrical upright body, and then is tied up in order to avoid any tampering of connection of the capture chamber to the guiding member.

12. The insect trap of claim 1, wherein pheromone dispensers and insecticide dispensers are positioned in the retention blades and insecticide dispensers are positioned in some of the pockets.

13. The insect trap of claim 1, wherein the perforated top end of the capture chamber has a basically flat surface that is perforated with a number of perforations.

14. The insect trap of claim 13, wherein the number of perforations are circular and each have a diameter of about 0.075 inches.

15. The insect trap of claim 1, wherein the insect trap includes polypropylene and, thus, is flexible and recyclable.

16. The insect trap of claim 1, wherein the insect trap comprises ultraviolet-resistant components.

17. The insect trap of claim 1, wherein the base member of the insect trap contains a fluorescent yellow-green pigment and the capture chamber comprises clear acrylic or styrene.

18. A method of using an insect trap comprising a plastic base member, that comprises a tubular body and a top including a number of openings, a plastic guiding member, that comprises a lower ring, an upper ring having a cylindrical outer vertical surface, a horizontal, ringular top surface and a number of apertures in the ringular top surface, plastic meshes extending from and connecting the lower ring to the upper ring and connecting means having a bottom extension, and a capture chamber, that comprises a cylindrical upright body with locking elements that extend downwardly from the cylindrical upright body, said method comprising:

(a) positioning the bottom extension of the connecting means of the guiding member onto the number of openings of the top of the base member and twisting the guiding member in one direction until the guiding member and the base member are locked to each other; and (b) positioning the locking elements of the capture chamber onto the number of apertures in the upper ring of the guiding member and twisting the capture chamber in one direction until the guiding member and the capture chamber are locked together.

19. The method of claim 18, said method further comprising:

twisting the capture chamber in an opposite direction until the capture chamber can be separated from the guiding member by lifting the capture chamber and, then, lifting the capture chamber.

20. The method of claim 18, said method further comprising:

twisting the guiding member in an opposite direction until the guiding member can be separated from the base member by lifting the guiding member and, then, lifting the guiding member.

* * * * *

UNITED STATES PATENT AND TRADEMARK OFFICE
CERTIFICATE OF CORRECTION

PATENT NO.    : 6,430,868 B1
DATED         : August 13, 2002
INVENTOR(S)   : Thomas Alferd Plato et al.

It is certified that error appears in the above-identified patent and that said Letters Patent is hereby corrected as shown below:

<u>Title page, Item [54] and Column 1, lines 1-4,</u>
Please delete "INSECT TRAP FOR CAPTURING NUMEROUS SPECIES OF THE COLEPTERAN ORDER AND METHOD OF OPERATION THEREOF" and insert therefor -- INSECT TRAP FOR CAPTURING NUMEROUS SPECIES OF THE COLEOPTERAN ORDER AND METHOD OF OPERATION THEREOF --.

<u>Column 5,</u>
Line 2, please delete "upper ring are" and insert therefor -- upper ring 9 are --.

<u>Column 12,</u>
Line 9, please delete "a perforated top end that are extensions of the" and insert therefor -- a perforated top end that is an inward extension of the --.

Signed and Sealed this

Thirteenth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,430,868 B1
DATED          : August 13, 2002
INVENTOR(S)    : Thomas Alfred Plato et al.

It is certified that error appears in the above-identified patent and that said Letters Patent is hereby corrected as shown below:

Title page, Item [54] and Column 1, lines 1-4,
Please delete "INSECT TRAP FOR CAPTURING NUMEROUS SPECIES OF THE COLEPTERAN ORDER AND METHOD OF OPERATION THEREOF" and insert therefor -- INSECT TRAP FOR CAPTURING NUMEROUS SPECIES OF THE COLEOPTERAN ORDER AND METHOD OF OPERATION THEREOF --.

Column 5,
Line 2, please delete "upper ring are" and insert therefor -- upper ring 9 are --.

Column 12,
Line 9, please delete "a perforated top end that are extensions of the" and insert therefor -- a perforated top end that is an inward extension of the --.

This certificate supersedes Certificate of Correction issued May 13, 2003.

Signed and Sealed this

Nineteenth Day of August, 2003

JAMES E. ROGAN
*Director of the United States Patent and Trademark Office*